United States Patent Office 3,390,997

Patented July 2, 1968

3,390,997

PHOTOSENSITIVE COMPOSITION COMPRISING A TRIPHENYLMETHANE DERIVATIVE AND A NITROGEN-CONTAINING PHOTO-OXIDANT

Robert Emms Read, Newark, Del., assignor to E. I. du Pont de Nemours and Company, Wilmington, Del., a corporation of Delaware No Drawing. Filed Apr. 29, 1964, Ser. No. 363,639
8 Claims. (Cl. 96—48)

ABSTRACT OF THE DISCLOSURE

This invention is directed to a light-sensitive composition comprising an intimate admixture of an alkylthio, benzylthio, 2-phenylhydrazino or alkoxycarbonyl derivative of a triphenylmethane and a selected non-volatile, nitrogen-containing compound which functions as a photooxidant. Upon irradiation with a pattern of ultraviolet light, this novel composition quickly undergoes a color change to form a clear image.

Image-forming compositions and processes for forming images play an essential part in photography, thermography, and related arts dealing with writing, printing, and the production of images with the aid of light, heat, electricity, or combinations of these activating influences. Currently available methods of image production impose numerous objectionable limitations which are costly, inconvenient, time-consuming, and sometimes potentially hazardous.

It is, therefore, an object of this invention to provide a new and novel composition which is sensitive to ultraviolet light and which forms permanent color when irradiated. Another object is to provide such a composition which forms a permanent colored image when irradiated in a graphic pattern. A still further object is to provide a photosensitive paper which can be imaged by irradiation with light in a graphic pattern when utilizing the composition of the present invention.

These and other objects of the invention will be apparent from the following description and claims.

More specifically, the present invention is directed to a light-sensitive composition comprising an intimate admixture of (1) a triphenylmethane compound having the formula

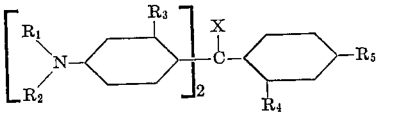

wherein $R_1$ and $R_2$ are $C_1$ to $C_{12}$ alkyl, lower alkoxyalkyl, 2-cyanoethyl, 2-hydroxyethyl, aralkyl, or aryl; $R_3$ and $R_4$ are hydrogen, methyl, ethyl, bromine, chlorine, fluorine or $C_1$ to $C_5$ alkoxy; $R_5$ is hydrogen, $C_1$ to $C_8$ alkyl, $C_1$ to $C_5$ alkoxy, cyano, bromine, chlorine, fluorine, carbamoyl, nitro, or tertiary nitrogen bearing $R_1$ and $R_2$ groups as heretofore defined; and X is benzylthio, $C_1$ to $C_5$ alkylthio, 2-phenylhydrazino, or $C_1$ to $C_5$ alkoxycarbonyl; and (2) a non-volatile, nitrogen-containing photooxidant of such a character that the defined triphenylmethane derivative of (1) and said photooxidant produce color when about 10 mgs. of each of these compounds (1) and (2) are mixed together in 10 ml. of a 50:50 mixture of ethyl acetate and dimethylsulfoxide in a quartz vessel and irradiated with light having a wavelength of from about 2000 A. to about 4200 A.

Another embodiment is a light-sensitive product comprising a supporting base carrying a light-sensitive composition as heretofore defined. Paper treated with such a novel composition is still another embodiment.

A preferred composition of the present invention is one wherein the triphenylmethane is the ethyl ester of tris(p-dimethylaminophenyl)acetic acid and the photooxidant is a dimer of 2-(o-chlorophenyl)-4,5-diphenylimidazolyl.

Still another embodiment is the novel process of forming a colored material wherein the novel light-sensitive composition heretofore defined is irradiated with light having a wavelength from about 2000 A. to about 4200 A.

The triphenylmethane derivatives which contribute the coloring component to the light-sensitive compositions of the present invention include the following representative compounds.

(a) Thio derivatives:
- tris(p-dimethylaminophenyl)benzylthiomethane
- bis(p-dimethylaminophenyl)-p-dipropylaminophenylbenzylthiomethane
- bis(p-dimethylaminophenyl)-p-propoxyphenylbenzylthiomethane
- bis(p-diethylaminophenyl)-p-cyanophenylbenzylthiomethane
- bis(p-diethylaminophenyl)-p-chlorophenylbenzylthiomethane
- bis(p-diethylaminophenyl)-p-fluorophenylbenzylthiomethane
- bis(p-diethylaminophenyl)-p-pentoxyphenylbenzylthiomethane
- bis(p-diethylaminophenyl)-p-carbamoylphenylbenzylthiomethane
- bis(p-diethylaminophenyl)-p-nitrophenylbenzythiomethane
- bis(4-diethylamino-2-methoxyphenyl)-p-ethylphenylmethylthiomethane
- bis(4-diethylamino-2-propoxyphenyl)-2-chloro-4-octylphenylethylthiomethane
- bis(p-diethylaminophenyl)-2,4-dimethoxyphenylpropylthiomethane
- bis(p-diethylaminophenyl)-4-bromo-2-methoxyphenylbutylthiomethane (b) 2-phenylhydrazino derivatives:
- 1-tris(p-diethylaminophenyl)methyl-2-phenylhydrazine
- 1-tris(4-diethylamino-2-chlorophenyl)methyl-2-phenylhydrazine
- 1-tris(4-diethylamino-o-tolyl)methyl-2-phenylhydrazine
- 1-[bis(p-dimethylaminophenyl)phenylmethyl]-2-phenylhydrazine
- 1-[bis(4-dimethylamino-2-methoxyphenyl)-p-nitrophenylmethyl]-2-phenylhydrazine
- 1-[bis(p-dipropylaminophenyl)-2,4-dichlorophenylmethyl]-2-phenylhydrazine (c) Alkoxycarbonyl derivatives:
- tris(p-dimethylaminophenyl)ethoxycarbonylmethane (or ethyl tris(p-dimethylaminophenyl)acetate)
- tris(p-dibutylaminophenyl)pentoxycarbonylmethane
- tris(4-didodecylamino-o-tolyl)methoxycarbonylmethane
- tris[4-(N-ethyl-N-phenylamino)-2-ethylphenyl]ethoxycarbonylmethane
- tris[4-bis(2-methoxyethyl)amino-2-bromophenyl]ethoxycarbonylmethane
- tris[4-bis(2-cyanoethyl)amino-2-chlorophenyl]ethoxycarbonylmethane
- tris[4-bis(2-hydroxyethyl)amino-2-fluorophenyl]ethoxycarbonylmethane
- tris(4-dibenzylamino-2-pentoxyphenyl)ethoxycarbonylmethane The above 2-phenylhydrazino derivatives of the triphenyl methanes are prepared by the method described by H. Wieland et al., Ber. 55, 1830 (1922). The alkoxycarbonyl derivatives or the lower alkyl esters of triphenyl substitutes of acetic acid are prepared as described by A. Guyot, Compt. rend. 144, 1120 (1907). The benzylthio derivatives are made as described below in Example 1. The corresponding alkylthio derivatives are made similarly using an alkanethiol in place of α-toluenethiol.

Non-volatile, nitrogen-containing photo-oxidants which are adapted for use in the practice of this invention include the following compounds:

(a) 2,4,5-triarylimidazolyl dimers which undergo homolytic dissociation upon exposure to light of wavelength between 2000 A. and 4200 A. to form two 2,4,5-triarylimidazolyl free radicals. Each free radical is represented by the formula

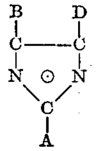

and has as an essential part of its structure one and only one unpaired electron which is delocalized throughout the conjugated triarylimidazolyl system. In the Formula A represents the group

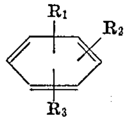

wherein $R_1$, $R_2$ and $R_3$ are hydrogen atoms or substituents free from a hydrogen atom capable of reacting with methyl magnesium iodide. Two of the R groups in adjacent positions on the phenyl ring when taken together may form a benzene ring. B and D are phenyl or phenyl substituted with up to three of the substituents $R_1$, $R_2$ and $R_3$ as already defined.

Additional representative dimers of imidazolyl free radicals other than those given in the examples which fall within the scope of the invention are the dimers of the following free radicals.

2-(p-benzylthiophenyl)-4,5-diphenylimidazolyl
2-(m-bromophenyl)-4,5-diphenylimidazolyl
2-(p-promophenyl)4,5-bis(p-methoxyphenyl)imidazolyl
2(p-iodophenyl)-4,5-diphenylimidazolyl
2-(p-cyanophenyl)-4,5-bis(p-methoxyphenyl)imidazolyl
2-(o-ethoxyphenyl)4,5-diphenylimidazolyl
2-(p-iodophenyl)-4,5-diphenylimidazolyl
2-(m-fluorophenyl(4,5-diphenylimidazolyl
2-(4-trifluoromethoxycyclohexyl)-4,5-diphenylimidazolyl
4,5-bis(p-methoxyphenyl)-2-(2,4-dichlorophenyl)-imidazolyl
2-(2,3-dimethoxyphenyl)-4,5-diphenylimidazolyl
2-(2,4-dimethoxyphenyl)-4,5-diphenylimidazolyl
2-(3,4-methylenedioxyphenyl)-4,5-diphenylimidazolyl
2-(p-methylthiophenyl)-4,5-diphenylimidazolyl
2-(2-naphthyl)-4,5-diphenylimidazolyl
2-(m-nitrophenyl)-4,5-diphenylimidazolyl
2-(p-nitrophenyl)-4,5-bis(p-methoxyphenyl)imidazolyl
2-(4-chloro-1-naphthyl-4,5-diphenylimidazolyl
2,4,5-triphenylimidazolyl
2-phenyl-4,5-di(2,4-xylyl)imidazolyl In general the substituents in the phenyl rings of the imidazolyl dimers which are free from a hydrogen atom capable of reacting with methyl magnesium iodide to yield methane include alkyl, alkoxy, alkoxycarbonyl, alkylthio, dialkylcarbamoyl, dialkylsulfamoyl, alkanoyloxy, N-alkylalkanamido, aryl, aryloxy, arylthio, benzo, halogen, cyano and nitro groups. The alkyl groups of these substituents including the alkoxy substituents can be of any chain length, preferably being lower $C_1$ to $C_5$ alkyls. Examples of undesirable groups are hydroxyl, thiol, carboxyl, amino and alkylamino.

The above dimers are prepared from triarylimidazoles corresponding to the imidazolyls. The tri arylimidazoles are prepared by reacting benzil or a substituted benzil with benzaldehyde or a substituted benzaldehyde as described by Davidson et al., J. Org. Chem., 2, 319 (1937) or as shown in Belgian Patent No. 589,417. The intermediate triarylimidazoles are then ozidized to the dimers with potassium ferricyanide as described by Hayashi et al., Bull. Chem. Soc., Japan, 33, 565 (1960).

(b) Bibenzotriazoles represented by 1,2'-bibenzotriazole; 5,5'-dichloro-1,1'-bibenzotriazole and 5,5'-dimethyl-1,1'-bibenzotriazole.

Additional illustrations of bibenzotriazoles which may be used are:

tetranitro-1,2'-bibenzotriazole
4'-chloro-1,2'-bibenzotriazole
5'-bromo-5-fluoro-1,2'-bibenzotriazole
5-chloro-4',6'-dimethyl-1,2'-bibenzotriazole
1,1'-bibenzotriazole
dinitro-1,1'-bibenzotriazole
sulfo-1,1'-bibenzotriazole
acetamido-1,1'-bibenzotriazole
benzamido-1,1'-bibenzotriazole 1,2'-bibenzotriazole and benzo ring substituted 1,2'-bibenzotriazoles except those having a nitro substituent are prepared by reacting a solution of the benzotriazole in aqueous sodium hydroxide with hydroxylamine-O-sulfonic acid to form a corresponding 2-aminobenzotriazole which is separated from its isomer by fractional crystallization. The 2-amino- benzotriazole is then mixed with o-chloronitrobenzene and heated to 160° to 205° C. for 5 hours in the presence of anhydrous sodium acetate to produce 2-(o-nitrophenylamino)benzotriazole. The product is isolated by filtration and recrystallized from ethanol. The 2-(o-nitrophenylamino)benzotriazole is catalytically reduced with hydrogen to 2-(o-aminophenylamino)benzotriazole. The 2-(o-aminophenylamino)benzotriazole is diazotized in the usual way with nitrous acid to convert the primary amine to a diazonium salt which couples with the secondary amino group to form a triazole ring and yield a 1,2'-bibenzotriazole.

The nitro derivatives cannot be prepared by this procedure because the reduction step converts to primary amine any other nitro group in addition to that required in the ortho position. This leads to loss of the nitro group and to complication in subsequent diazotization step. Nitro derivatives of 1,2'-bibenzotriazole are produced by treatment of the bibenzotriazole with nitric acid.

The 1,1'-bibenzotriazole and derivatives are prepared by tetraazotizing with nitrous acid o,o'-diaminoazobenzene or its derivatives to bisdiazonium salts. The resultant salts are then reduced to the 1,1'-bibenzotriazole with sulfur dioxide. Derivatives bearing such substituents as alkyl, halogen, sulfo, nitro or alkanamido are prepared from the correspondingly substituted o,o'-diaminoazobenzene.

(c) Diacylaminobenzotriazoles represented by 1-diacetylaminobenzotriazole and 1-dibenzoylamino-5-chlorobenzotriazole. [Chemical Abstracts, 55, 9382 (1961).]

(d) Diacylaminopyrazoles such as 1-diacetylaminopyrazole and 1-dipropionylamino-4-chloropyrazole.

Additional illustrative diacylaminopyrazoles are:

1-(diacetylamino)-4-methylpyrazole
1-(dibutyrylamino)-4-nitropyrazole
1-(diacetylamino)-3,5-dicyanopyrazole
1-(dibenzoylamino)-3,5-diphenylpyrazole
1-(dipropionylamino)-3,5-dibromopyrazole.

The diacylaminopyrazoles which may be used as photooxidants in this invention are prepared by reacting pyrazole or pyrazole substituted in one or more of the 3, 4, or 5-positions with alkyl, halogen, aryl, nitro or cyano with hydroxylamine-O-sulfonic acid in aqueous sodium hydroxide solution to form a 1-aminopyrazole. The 1-aminopyrazole is then reacted with the necessary acid anhydride or acid halide to form the corresponding 1-diacylaminopyrazole.

(e) Tetraacylhydrazines such as:
tetraacetylhydrazine
tetraformylhydrazine
tetrabenzoylhydrazine (f) Tetraarylhydrazine such as:
tetraphenylhydrazine
tetra-p-tolylhydrazine (g) Benzothiazole disulfides represented by:
bis(2-benzothiazolyl)disulfide
bis(6-methoxy-2-benzothiazolyl) disulfide (h) Triacylhydroxylamines such as:
N,N,O-triacetylhydroxylamine
N,N,O-tripropionylhydroxylamine
N,N,O-tribenzoylhydroxylamine
N,N,O-tri-p-chlorobenzoylhydroxylamine Operable representative compositions of the heretofore defined leuco dyes and a nitrogen containing photooxidant as illustrated by the above listings of groups of compounds are observed and identified in the following way. About 10 mgs. of both the leuco dye and the photooxidant candidate are added to about 10 mls. of a solution of equal parts by volume of ethyl acetate and dimethylsulfoxide contained in a quartz vessel. The solution is stirred to insure that at least a portion of each of the added solid materials dissolves. The resultant solution is then irradiated with light having a wavelength from about 2000 A. to about 4200 A. The formation of an intense color in the solution indicates a light-sensitive composition.

Other solvents and combinations of solvents may be used with particular compositions. However, the above combination of solvents has been found to be applicable in the entire range of compounds which are useful in the present invention.

The compositions of the present invention may be applied to substrates such as paper or film to provide a photosensitive sheet on which an image may be formed by exposure to ultraviolet light in a graphic pattern. It has been found that better results are obtained when the paper or film retains some of the solvent.

The statement that "solvent" be retained by the substrate, paper for instance, does not mean that the paper must necessarily be wet, humidified, or otherwise specially handled. Such solvents as N,N-dimethylformamide, N,N-diethylacetamide, dimethylsulfoxide are so strongly adsorbed by cellulosic and plastic substrates that prolonged heating under vacuum is necessary for complete solvent removal. Ordinary drying such as that employed in paper manufacture or in film casting results in the retention of ample solvent to give a composition with good photosensitivity. The compositions so produced are definitely dry to the touch and stable to storage at room temperature.

Some solvents such as methanol, ethanol and the like may be removed from cellulosic materials readily and completely enough to reduce the photosensitivity of the composition to undesirably low levels. When such combinations of solvents-substrates are employed, images having the highest optical density are formed only when the substrate is wet to the touch. Such solvents are best used in applications which permit storage of the treated paper under conditions which prevent solvent evaporation. When an image is being formed on a wet substrate, solvents of this type may be used with the advantage that simple drying retards color formation in uncolored areas. In general, a solvent should dissolve at least some of both the photo-oxidant and color-generator. It should not, of course, react with the photosensitive materials.

In general, a preferred solvent has a boiling point of at least 60° C. at atmosphere pressure. Solvents with low vapor pressures and consequent high boiling points may be used. Their failure to be readily removed by evaporation will not present a problem, if the quantity used is restricted, as it readily can be in mixtures of solvents with relatively high vapor pressures. It is preferable to have at least 0.5% by weight of solvent retained by such a substrate as paper to ensure optimum image formation upon proper radiation. Among the solvents which have been and may be employed on paper are formamide, N,N-dimethylformamide, N,N-dimethylacetamide, hexanamide, stearamide, methanol, ethanol, 1-propanol, 2-propanol, butanol, ethylene glycol, polyethylene glycols, ethyl acetate, ethyl benzoate, benzene, o - dichlorobenzene, toluene, dimethylsulfoxide, pyridine, tetrahydrofuran, dioxane, dicyanocyclobutane, 1-methyl-2-oxohexamethylenimine, and mixtures of these solvents in various proportions as may be required to attain solution of the particular photooxidant and color-generator selected for use in the photosensitive composition.

In addition to a residual amount of a solvent, a binder may be present in the light-sensitive composition spread over a substrate. Binders which may optionally be added to the composition are inert materials that serve to adhere the photosensitive mixture to a substrate. The binder also may serve to thicken the solution of the composition should this be desirable for specific applications. Representative binders that will be found applicable are ethyl cellulose, polyvinyl alcohol, polyvinyl chloride, polystyrene, polyvinyl acetate, polymethyl methacrylate, cellulose acetate, cellulose nitrate, chlorinated rubber, polymers and copolymers of vinyl monomers, gelatin. The solution containing a binder in addition to the subject photosensitive composition can be cast, extruded or otherwise formed into unsupported films. These films may be imaged similarly to the foregoing impregnated compositions.

The substrates are materials to which the light-sensitive, image-forming compositions may be applied as a coating or impregnant. They are materials commonly used in the graphic arts and in decorative applications. These materials include paper ranging from tissue paper to heavy cardboard; films of plastics and polymeric materials such as regenerated cellulose, cellulose acetate, cellulose nitrate, polyesters of glycol and terephthalic acid, vinyl polymers and copolymers, polyethylene, polyvinyl acetate, polymethyl methacrylate; textile fabrics; glass, wood and metals.

In applying a solution to paper, films, fabrics, or to the surfaces of rigid substrates such as glass, wood or metals, the solution may be sprayed, brushed, applied by a roller or an immersion coater, flowed over the surface, picked up by immersion or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 mg./in.$^2$ to about 5.0 mg./in.$^2$ of the leuco dye and the equivalent amount of photo-oxidant. Images of greater and lesser intensity of color are provided by the application of greater and lesser amounts of leuco dye to the substrate.

The binder may be used in an amount varying from about 0.5 part to about 200 parts by weight of the combined weight of the leuco dye and the biimidazole photooxidant.

The leuco dye and the photooxidant of the invention may be mixed in mole ratios within the range from about 10:1 (leuco dye:photo-oxidant) to about 1:10. The preferred range is 2:1 to 1:2, while the preferred ratio is about 1:1.

The substrates bearing the solution of the leuco dye and biimidazole, and optionally a binder, may be dried simply at room temperature. They may also be dried under vacuum at room temperature or at elevated temperatures. The upper temperature limit is critical in combination with exposure time. A short exposure to heat of 90° C. may not be detectably harmful, while several hours exposure to this heat may reduce the light sensitivity of the composition.

Any convenient source of ultraviolet light may be used to activate the light-sensitive composition and induce the formation of an image. Among the light sources which have been employed are a sun lamp, an electronic flash gun, a germicidal lamp, ultraviolet lamps providing specifically light of short wavelength (2537 A.) and lamps providing light of long wavelength (3663 A.) The light exposure time will vary from a fraction of a second to several minutes depending upon the intensity of the light, its distance from the light-sensitive composition, the nature and amount of the light-sensitive composition, and the intensity of color in the image desired. In general, light sources that supply radiation in the region between about 2000 A. and about 4200 A. are useful in producing images with the leuco dye-photo-oxidant solvent compositions on numerous substrates.

Images may be formed by a beam of light or by exposure to light of a selected area behind a negative, a stencil, or other relatively opaque pattern. The negative may be a silver negative with cellulose acetate or polyester film. The negative may also be one in which the opacity results from aggregations of areas of different refractive index. Image formation may also be accomplished in conventional diazo printing apparatus.

The range of activating radiation may be extended to longer wavelengths by adding certain dyes to the photosensitive composition. Such dyes function as sensitizers as is well known in the art. An extensive discussion of sensitizers is given by C. E. Kenneth Mees in his book "The Theory of the Photographic Process," The MacMillan Company, New York (1952), pages 961 to 1083.

The novel, light-sensitive compositions of this invention have significant utility in a variety of applications. Among these are:

(1) Printing applications.—Very soft paper, as for example tissue paper, can be easily imaged when it has been treated with the subject photosensitive composition, by projecting an image onto the treated surface.

(2) Radiation dosimeters.—Paper or plastic film may be impregnated or coated with the subject photosensitive compositions and these may be used to determine the quantity of solar radiation that falls on a particular surface.

(3) Layout for metal working.—The photosensitive composition may be applied to a metal surface when suitably formulated as a paint or a lacquer. The metal surface may then be marked by irradiation through a suitable template to produce an image. The image may correspond to holes which are to be drilled or other operations of metal working and manufacture. This technique is particularly valuable when the metal to be marked has an irregular shape.

(4) Blueprints.—When applied to paper or plastic films, the light-sensitive compositions of this invention find application in diazo printout equipment.

Represenative examples illustrating the present invention follow.

EXAMPLE 1

Preparation of tris(p-dimethylaminophenyl)benzylthiomethane

To a mixture of 20 ml. of α-toluenethiol, 50 ml. of dry dimethylformamide, and 50 ml. of dry benzene was added 1.0 g. of a 52% dispersion of sodium hydride in mineral oil. Then to this mixture was added 8.1 g. of Crystal Violet dye, CI 42555, dissolved in 50 ml. of dry dimethylformamide. The color of the dye was immediately discharged. The solvents were removed under reduced pressure, and the solid residue was recrystallized from acetone to yield 8.4 g. of a white solid having a melting point of 190° C. and identified as tris(p-dimethylaminophenyl)benzylthiomethane by elemental analysis.

Calculated for $C_{32}H_{37}N_3S$: C, 77.5%; H, 7.5%; N, 8.5%; S, 6.5%. Found: C, 77.5%; H, 7.5%; N, 8.3%; S, 6.5%.

Light-sensitive composition.—In 25 ml. of dimethylsulfoxide was dissolved 0.15 g. of the above tris(p-dimethylaminophenyl)benzylthiomethane and 0.20 g. of the dimer of 2-(o-chlorophenyl)-4,5-diphenylimidazolyl. The resultant solution was coated onto a glass fiber sheet and the sheet was dried under a 250 watt infrared lamp at a distance of 7 inches for 20 minutes. Upon exposure through a stencil to ultraviolet light from a 275 watt sun lamp for 60 seconds at a distance of 10 inches an intense blue image formed. Irradiation of a deposit of only the benzylthiomethane compound gave no color and image.

EXAMPLE 2

By the procedure of Example 1 an intimate mixture of 1 - tris - (p - dimethylaminophenyl)methyl - 2 - phenylhydrazine and a dimer of 2 - (o - chlorophenyl) - 4,5-diphenylimidazolyl was deposited on a glass fiber sheet and produced a blue image upon irradiation with ultraviolet light.

EXAMPLE 3

Similarly, as in Examples 1 and 2, a mixture of the ethyl ester of tris(p-dimethylaminophenyl)acetic acid and a dimer of 2-(o-chlorophenyl)-4,5-diphenylimidazolyl was deposited on a sheet of glass fiber and irradiated with ultraviolet light. A distinct blue image formed. No color or image was produced when the leuco dye alone on the sheet was irradiated.

EXAMPLE 4

About 10 mgs. of the dimer of 2-(o-bromophenyl)-4,5-diphenylimidazolyl as photooxidant and about 10 mgs. of tris(p-dibutylaminophenyl)ethoxycarbonylmethane as coloring component are mixed with 10 mls. of a solution of equal parts by volume of ethyl acetate and dimethylsulfoxide in a quartz vessel and then illuminated with ultraviolet light from a 275 watt sun lamp for 60 seconds at a distance of 5 inches. An intense blue color is formed. This color is permanent.

In the absence of the above photo-oxidant no color is formed. In the absence of the coloring component a transient violet color is formed. This violet color disappears within one to two minutes in the dark.

Intense colors are obtained when the procedure of Example 4 is followed except that the tris(p-dibutylaminophenyl)ethoxycarbonylmethane is replaced by about 10 mgs. of the following coloring components.

(5) Bis(p - diethylaminophenyl) - p - cyanophenylbenzylthiomethane.

(6) Bis(4 - diethylamino - 2 - propoxyphenyl) - 2-chloro-4-octylphenylethylthiomethane.

(7) 1-Tris(4 - diethylamino - 2 - chlorophenyl)methyl-2-phenylhydrazine.

(8) 1-[Bis(4-dimethylamino - 2 - methoxyphenyl)-p-nitrophenylmethyl]-2-phenylhydrazine.

(9) Tris[4 - bis(2 - hydroxyethyl)amino - 2 - fluorophenyl]-ethoxycarbonylmethane.

(10) Tris[4(N - ethyl - N - phenylamino) - 2 - ethylphenyl]-methoxycarbonylmethane.

A blue color is obtained when, in Example 4, the imidazolyl dimer is replaced by about 10 mgs. of the following photooxidants.

(11) Dimer of 2-(1-naphthyl-4,5-diphenylimidazolyl.

(12) 1,2′-Bibenzotriazole.

(13) 5,5′-Dichloro-1,1′-bibenzotriazole.

(14) 1-Dibenzoylamino-5-chlorobenzotriazole.
(15) 1-Diacetylaminopyrazole.
(16) Tetraacetylhydrazine.
(17) Tetraphenylhydrazine.
(18) Bis(2-benzothiazolyl) disulfide.
(19) N,N,O-triacetylhydroxyamine.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A light sensitive composition comprising an intimate admixture of (1) a triphenylmethane compound having the formula

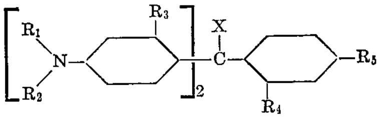

wherein $R_1$ and $R_2$ are selected from the group consisting of $C_1$ to $C_{12}$ alkyl, lower alkoxyalkyl, 2-cyanoethyl, 2-hydroxyethyl, aralkyl and aryl; $R_3$ and $R_4$ are selected from the group consisting of hydrogen, methyl, ethyl, bromine, chlorine, fluorine and $C_1$ to $C_5$ alkoxy; $R_5$ is selected from the group consisting of hydrogen, $C_1$ to $C_8$ alkyl, $C_1$ to $C_5$ alkoxy, cyano, bromine, chlorine, fluorine, carbamoyl, nitro and tertiary nitrogen bearing $R_1$ to $R_2$ groups as heretofore defined; and X is selected from the group consisting of benzylthio, $C_1$ to $C_5$ alkylthio, 2-phenylhydrazino, and $C_1$ to $C_5$ alkoxycarbonyl; and (2) a non-volatile, nitrogen-containing photooxidant of such a character that the heretofore defined triphenylmethane derivative of (1) and said photooxodant produce color when about 10 mgs. of each of these compounds (1) and (2) are mixed together in 10 ml. of a 50:50 mixture of ethyl acetate and dimethylsulfoxide in a quartz vessel and irradiated with light having a wavelength of from about 2000 A. to about 4200 A.

2. The composition of claim 1 wherein the photooxidant of component (2) is selected from the class consisting of hexaarylbiimidazoles, bibenzotriazoles, diacylaminobenzotriazoles, diacylaminopyrazoles, tetraacylhydrazines, tetraarylhydrazines, benzothiazole disulfides, and triacylhydroxylamines.

3. The composition of claim 1 wherein the photooxidant of component (2) is a hexaphenylbiimidazole in which each phenyl ring can be substituted with up to three substituents selected from the class consisting of alkyl, alkoxy, alkoxycarbonyl, alkylthio, dialkylcarbamoyl, dialkylsulfamoyl, alkanoyloxy, N-alkylalkanamido, aryl, aryloxy, arylthio, benzo, halogen, cyano and nitro.

4. A film treated with a composition of claim 1.

5. A composition according to claim 1 wherein the triphenylmethane is the ethyl ester of tris(p-dimethylaminophenyl) acetic acid and the photooxidant is a dimer of 2-(o-chlorophenyl)-4,5-diphenylimidazolyl.

6. A light-sensitive product comprising a supporting base carrying a light-sensitive composition as heretofore defined in claim 1.

7. Paper treated with a light-sensitive composition according to claim 1.

8. A process of forming a colored material which comprises irradiating a light-sensitive composition of claim 1 with light having a wavelength from about 2000 A. to about 4200 A.

References Cited

UNITED STATES PATENTS

| | | | |
|---|---|---|---|
| 3,042,515 | 7/1962 | Wainer | 96—90 |
| 3,284,205 | 11/1966 | Sprague et al. | 96—90 |
| 3,285,744 | 11/1966 | Sprague et al. | 96—90 |

FOREIGN PATENTS

| | | |
|---|---|---|
| 917,919 | 2/1963 | Great Britain. |

NORMAN G. TORCHIN, *Primary Examiner.*

C. E. DAVIS, *Assistant Examiner.*